Figure 1:
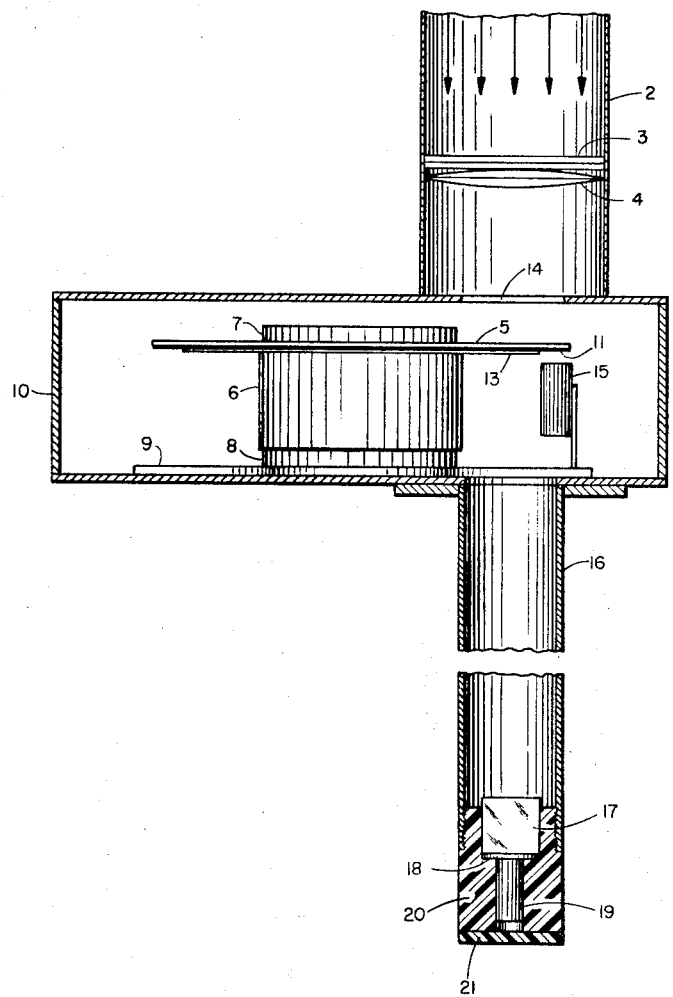

Nov. 7, 1967 P. B. ALERS 3,350,978
OPTICAL ROTATION MEASURING INSTRUMENT
Filed Feb. 21, 1963 2 Sheets-Sheet 1

INVENTOR
PERRY B. ALERS
BY
ATTORNEYS 3,350,978
OPTICAL ROTATION MEASURING
INSTRUMENT
Perry B. Alers, 2914 W St. SE., Washington, D.C. 20021
Filed Feb. 21, 1963, Ser. No. 260,966
7 Claims. (Cl. 88—14)

The invention described herein may be manufactured and used by or for the Government of the United States of America for governmental purposes without the payment of any royalties thereon or therefor.

This invention relates to measuring apparatus, more particularly to a magneto-optical instrument for determining the strength of high magnetic fields.

In the past, measurement of the strength of high magnetic fields has been accomplished by use of a flip coil technique, but this method has several disadvantages. First, the coil, itself, must be manipulated by the operator standing near the magnet in use. This entails some degree of risk since high strength magnets are capable of dissipating large amounts of power. Bitter (as described in Modern Magnetism, by L. F. Bates, 1948, pages 350–351) type solenoid magnets designed to provide steady fields having maximum values ranging from 80 to 130 kilogauss when fully energized dissipate about 2 megawatts of power. Second, the associated instrumentation is rather delicate and requires a certain amount of skill on the part of the operator. Finally, the coil technique itself is not readily adaptable to the sort of continuous field reading which is desirable for monitor purposes at a control console.

An object of the present invention is the provision of an improved measuring instrument which is responsive to strong magnetic fields.

A further object is the provision of a magneto-optical instrument for the measurement of the strength of high magnetic fields which is not subject to the aforementioned disadvantages.

The above objects are accomplished in the measuring instrument of my invention which for its operation is based on the Faraday effect: the rotation of the plane of polarization of a beam of linearly (plane) polarized light as it passes through a transparent material in a magnetic field. The amount of rotation is proportional to the strength of the magnetic field, and the instrument of my invention is designed to measure this rotation directly.

The measuring instrument of the invention broadly stated, comprises a field probe section and a comparator section. In the field probe section, a pair of reference pulses and a sinusoidal signal are developed photoelectrically, the reference pulses from light of a selected single wavelength and the sinusoidal signal from the light after it has been linearly polarized and and placed under rotation at a predetermined constant rate and passed through glass or other magneto-optically active body in the magnetic field. The phase of the sinusoidal signal is determined by the degree of rotation imparted to the rotating plane polarized light as it passes through the magneto-optically active body in the magnetic field. In the comparator section the sinusoidal signal and the pair of reference pulses are electrically displayed in phase relationship and calibrated means for changing the phase relationship between the reference pulses and the sinusoidal signal are employed for determining the strength of the magnetic field.

Figure 2:
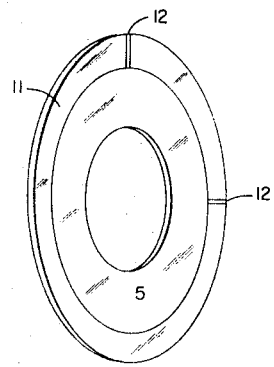
Figure 3:
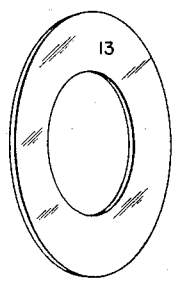
Figure 4:
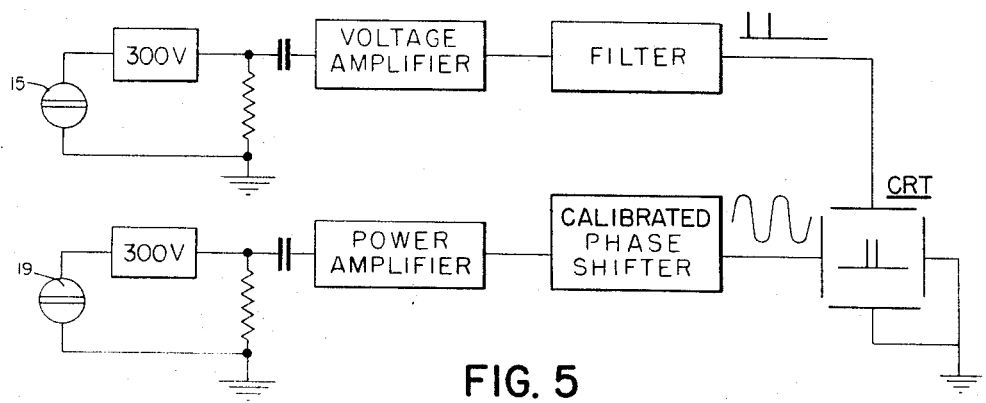
Figure 5:
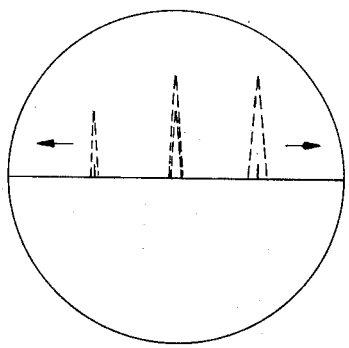

For a more full and clear understanding of the invention reference is made to the following description and the accompanying drawings. In the drawings, like numerals indicate like parts and FIG. 1 is a showing, somewhat schematic and partly in section, of a form of the field probe section of the instrument of the invention, FIG. 2 is a showing in face view of an arrangement of parts of the field probe section as shown in FIG. 1, FIG. 3 is a showing in face view of a further part of the field probe section as shown in FIG. 1, FIG. 4 is a schematic showing of the comparator section and of the photoelectric conversion means of the instrument of the invention, and FIG. 5 is a pictorial presentation of the face of an oscilloscope showing a phase relationship of the sweep signal and the reference pulses.

Referring to FIGURE 1 of the drawing, the field probe section therein shown has a suitable light source (not shown) which may be a 6 volt DC incandescent lamp. The lamp may be mounted on the upper end of the metal tube 2 in which are also mounted, an interference filter 3 for selection of light of a single wavelength from the light source and a lens 4 for focusing of the monochromatic light into a beam.

An annular transparent plate 5 of glass is mounted on a commercial fan-type induction motor 6 for rotation with the motor. The plate 5, which may be of 10 cm. outer diameter, has an inner diameter of a magnitude which allows the plate to frictionally engage the neck portion 7 of the motor for rotation therewith. The motor 6 is mounted for rotation in a ring-like metal platform 8 provided with integral spider arms 9 which are detachably secured to the bottom wall of a metal box-type enclosure 10.

The annular glass plate 5 (FIGURE 2) has formed thereon an annular semi-opaque optical mask 11, suitably a film of aluminum which has been deposited on the glass by the known vacuum evaporation-deposition process. The thickness of the aluminum film may be on the order of 200 to 400 Angstroms. A pair of narrow radial light slits 12, 12, arranged 90° apart, are provided in the optical mask 11 by removal of the appropriate portions of the film. The light slits may be 1 mm. wide and each subtend an angle of 1°.

An annular sheet 13 of material for plane polarizing light (FIGURE 3), has an inner diameter of a magnitude to allow this sheet to be frictionally engaged over the neck portion 7 of the motor 6 for rotation with the latter. The outer diameter of the annular sheet 13, which may be 8 cm., is the same as the inner diameter of the annular optical mask 11 whereby, in the assembled condition of the annular transparent plate 5 and the annular sheet 13, the annular optical mask 11 will encircle the annular sheet 13 and these two parts together will extend over the one face of the transparent plate 5, which, as illustrated in FIGURE 1, is the underlying face of the plate 5.

The metal tube 2 is welded to the upper surface of the metal enclosure 10 and encircles an opening 14 in the enclosure 10 for passage of light. The motor 6 is arranged in the enclosure 10 so that the transparent plate 5 with accompanying optical mask 11 and the sheet 13 of light polarizing material are in the path of the light from the lens 6 which enters the enclosure 10 through the opening 14.

A photoelectric cell 15 is mounted in the metal enclosure 10 so as to receive light which passes through the narrow radial slits 12, 12 for production of the reference pulses.

An elongated metal tube 16 is welded to the under surface of the metal enclosure 10 in light communication with the enclosure for transmission of light from the light polarizing sheet 13 to a magneto-optically active body which may be a block of optical glass 17 which has been calibrated in a field of known size.

The optical glass 17 is mounted in the lower end of the metal tube 16 along with a stationary sheet 18 of material for plane polarizing light and a second photoelectric cell 19. A cylindrical block of plastic 20 is used

3 as a mounting means; the plastic block being externally threaded to engage the internal threading in the end of the tube 16. The plastic block 20 has a tubular opening therethrough, the upper portion of which is of larger diameter. The glass block 17 is seated in the upper cylindrical opening, as is the stationary sheet 18 of light polarizing material, with the latter lying immediately below the glass block. The photocell 19 is frictionally held in the narrower portion of the tubular opening of the plastic block beneath the sheet 18 of light polarizing material. The plastic block 20 has a surface groove which connects with an opening drilled laterally to the tubular opening for accommodating the lead wires from the photocell 19 which are passed upward through the tube 16 into the enclosure 10 to a multiple outlet box (not shown) located on one of the side walls of the enclosure 10. The lead wires from the photocell 15 pass directly to this multiple outlet box. A plastic cap 21, suitably of polymethyl methacrylate, encloses the lower end of the metal tube 16.

Referring to FIGURE 4, the photocell 15 for development of the reference pulses and the photocell 19 for development of the sinusoidal signal are each placed in series with a dropping resistor and a suitable power supply, which, as shown, may be a 300 volt source. Voltage pulses appear across the first series resistor and a sinusoidal voltage across the other series resistor.

An oscilloscope is used for the electronic presentation of the voltage pulses and sinusoidal voltage in phase relationship. The voltage pulses are passed through a voltage amplifier and a twin-T filter and are placed on the vertical deflection plates of the oscilloscope. The sine voltage is passed through two stages of amplification and a phase shifter and is placed on the horizontal deflection plates. The phase shifter may be model PS–60 of the Industrial Test Equipment Corporation.

In operation of the instrument of the invention for the measurement of the strength of a magnetic field, the induction motor 6 is set in operation to rotate the glass plate 5 and the sheet 13 of light polarizing material. Light from a DC source shines through the interference filter 3 which passes a narrow band of wavelengths centered around a selected wavelength, for example, 546 m$\mu$. The light, essentially monochromatic, is focused by the lens 4 so that part of it falls on the rotating sheet 13 of light polarizing material and part on the optical mask 11. The light that emerges from the polarizing sheet 13 has its plane of polarization rotating with the angular velocity of the motor 6. The mask 11, by virtue of the two light slits 12, 12, allows two pulses of light to pass at a rate which also depends on the speed of the motor 6.

The rotating plane polarized light passes down through the tube 16 to the calibrated glass block 17 which is placed in the magnetic field to be measured. The glass block may be cut to any convenient size. For a solenoid magnet, the direction of the light is easily made parallel to the field direction. For this orientation, the Faraday effect is a maximum. The rotating plane polarized light passes through the glass block 17 and then into the stationary sheet 18 of plane polarizing material. The stationary polarizing sheet 18 acts as an optical analyzer which passes plane polarized light which varies sinusoidally in intensity with a frequency twice that of the driving motor 6. This sinusoidal light falls upon the photoelectric cell 19 and appears across the series resistor as a sinusoidal voltage. Similarly, the photoelectric cell 15 behind the optical mask 11 receives two pulses of light for each rotation of the motor 6, and thus successive pairs of voltage pulses appear across the dropping resistor.

After the voltage pulses and the sinusoidal voltage have been displayed on the oscilloscope in the manner hereinabove described, the pattern which appears on the oscilloscope consists of two vertical pulses resting on a horizontal baseline (FIGURE 5). The position of the pulses relative to each other depends on the phase of the sinusoidal voltage producing the base line. For each revolution of the motor 6, the light falling on the photocell 19 behind the glass block 17 and the fixed polarizing sheet 18 undergoes two complete cycles of intensity. Thus, the two pulses developed by passage of light through the slits 12, 12 of the optical mask which are proximally 90° apart, fall 180° apart on the intensity sinusoid. It follows, therefore, that when the phase of the sinusoid is changed the two pulses in the oscilloscope will appear to change position with respect to each other.

The operation of the magneto-optical measuring device is relatively simple. First, the phase shifter is set to zero and the orientation of the piece of light polarizing material behind the glass block in the field probe is set so that the two pulses on the oscilioscope are superposed. This adjustment is made, of course, in the absence of a magnetic field. When the probe is in place in a field, the glass rotates the plane of polarization of the incoming light by an amount which depends on the strength of the field. This shifts the phase of the sine voltage generated in the photocell circuit and thus the pulses on the display oscilloscope appear to move apart. The phase shifter is then adjusted to bring them back to superposition, and the angle necessary to accomplish this is proportional to the angle of rotation introduced by the glass. Since the glass has previously been calibrated, the unknown field producing the rotation can now be determined.

In order to make a direct-reading instrument, I have replaced the angle scale on the phase meter with one reading directly in kilogauss. For ease in operation, two sets of numbers have been placed on the scale, one increasing clockwise, the other counterclockwise. This is useful because the sense of the Faraday rotation depends on the direction of the applied field, and the magnets can be energized to produce fields in either direction.

While the invention has been described with particular reference to the use of the instrument for measurement of the strength of magnetic fields, its usefulness is not limited thereto. The instrument of the invention may be used as a polarimeter, for example, as a saccharimeter. In a polarimeter, the light is transmitted through a body which in itself is optically active, for example, a body of a sugar solution.

Since the invention described herein may be variously practiced without departing from the spirit or scope thereof, it is intended that the preferred embodiment appearing in the above description shall be taken by way of illustration rather than in limitation except as may be required by the appended claims.

What is claimed is:

1. A measuring instrument which comprises:
    means for plane polarizing monochromatic light and for rotating the plane of the polarized light at a predetermined constant rate,
    means for producing from said monochromatic light a pair of sequential discrete light pulses for each cycle of rotation of said plane polarizing means, said means producing said pair of discrete light pulses being correlated to said cycle of rotation in such a manner that the first pulse of said pair is spaced one-fourth of said cycle from the second pulse of said pair and the second pulse of said pair is spaced three-fourths of said cycle from the first pulse of the next following cycle of rotation,
    an optically-active body arranged to receive rotating plants polarized light from said polarizing and plane rotating means,
    optical analyzing means arranged to receive rotating plane polarized light from said optically active body to select therefrom plane polarized light which varies sinusoidally in intensity,
    means arranged to receive sinusoidal plane polarized light from said optical analyzing means for conversion of said light to voltage which varies sinusoidally in intensity, means arranged to receive said pair of light pulses from said light-pulse producing means for conversion of light pulses to a corresponding pair of voltage pulses, and electronic means arranged to receive said sinusoidal voltage and said pair of voltage pulses and to visually display said voltage pulses with the distance between said displayed pulses varying with the phase relationship between said sinusoidal voltage and said pair of voltage pulses, said electronic means receiving said sinusoidal voltage on a first deflecting means for scanning in a first direction and receiving said voltage pulses on a second deflecting means for scanning in a second direction orthogonal to said first direction.

2. A measuring instrument as defined in claim 1, further including calibrated means for changing the phase relationship between said sinusoidal voltage and voltage pulses.

3. A measuring instrument as defined in claim 2 wherein said means for plane polarizing and rotating the plane of the polarized light includes a rotatable annular sheet of material for plane polarizing light and said means for producing light pulses includes a rotatable annular semi-opaque optical mask having a pair of narrow radial slits which are spaced 90° apart.

4. A magneto-optical instrument which comprises:
an annular transparent plate mounted for rotation,
an annular sheet of material for plane polarizing light mounted for rotation with said annular transparent plate,
an annular semi-opaque optical mask mounted for rotation with said annular transparent plate,
said annular optical mask having a pair of narrow radial slits which are spaced 90° apart,
said annular sheet of light polarizing material having an inner diameter equal to the inner diameter of said annular transparent plate and an outer diameter smaller than the outer diameter of said annular transparent plate,
said annular optical mask having an outer diameter equal to the outer diameter of said annular transparent plate and an inner diameter equal to the outer diameter of said annular sheet of light polarizing material,
said annular sheet of light polarizing material and said annular optical mask being mounted concentrically to extend over one face of said annular transparent plate,
means for rotating said annular transparent plate, said annular sheet of light polarizing material and said annular optical mask synchronously at a predetermined angular velocity,
a magneto-optically-active body arranged to receive rotating plane polarized light from said annular sheet of light polarizing material,
optical analyzing means arranged to receive rotating plane polarized light from said magneto-optically active body to select therefrom plane polarized light which varies sinusoidally in intensity,
means arranged to receive sinusoidal plane polarized light from said optical analyzing means for conversion of said light to voltage which varies sinusoidally in intensity,
means arranged to receive light pulses from the radial slits of said annular optical mask for conversion of said light pulses to corresponding voltage pulses,
means arranged to receive said sinusoidal voltage and said voltage pulses for electronically displaying said pulses in positions which correspond to the phase relationship of the pulses with respect to said sinusoidal voltage,
and calibrated means for changing the phase relationship between said sinusoidal voltage and voltage pulses.

5. A magneto-optical instrument as defined in claim 4, wherein said annular optical mask is affixed to the said face of the annular transparent plate.

6. A magneto-optical instrument which comprises:
an annular transparent plate mounted for rotation,
an annular sheet of material for plane polarizing light mounted for rotation with said annular transparent plate,
an annular semi-opaque mask affixed to one face of said annular transparent plate,
said annular optical mask having a pair of narrow radial slits which are spaced 90° apart,
said annular sheet of light polarizing material having an inner diameter equal to the inner diameter of said annular transparent plate and an outer diameter smaller than the outer diameter of said transparent plate,
said annular optical mask having an outer diameter equal to the outer diameter of said annular transparent plate and an inner diameter equal to the outer diameter of said annular sheet of light polarizing material,
said annular sheet of light polarizing material being arranged concentrically with said annular optical mask to extend over the one face of said annular transparent plate,
means for rotating said annular transparent plate and said annular sheet of light polarizing material synchronously at a predetermined angular velocity,
a magneto-optically-active body arranged to receive rotating plane polarized light from said annular sheet of light polarizing material,
a stationary sheet of material for plane polarizing light arranged to receive rotating plane polarized light from said magneto-optically-active body,
means including a photoelectric cell arranged to receive sinusoidal plane polarized light from said stationary sheet of plane polarizing material for conversion of said light to voltage which varies sinusoidally in intensity,
means including a photoelectric cell arranged to receive light pulses from said radial slits of the annular optical mask for conversion of said light pulses to corresponding voltage pulses,
means arranged to receive said sinusoidal voltage and said voltage pulses for electronically displaying said pulses in positions which correspond to the phase relationship of the pulses with respect to said sinusoidal voltage,
and calibrated means for changing the phase relationship between said sinusoidal voltage and voltage pulses.

7. The measuring instrument as defined in claim 1 wherein said means for electronically displaying said voltage pulses comprises a cathode ray tube and said voltage pulses are supplied to a first deflecting means in said tube and said voltage which varies sinusoidally in intensity is supplied to a second deflecting means in said tube.

References Cited

UNITED STATES PATENTS 2,730,567  1/1956  McConnell.
2,861,493  11/1958  Landengren _____ 88—14

OTHER REFERENCES

Lentz, T., and Miyata, J.: Journal of the Optical Society of America, vol. 51, No. 8, August 1961, "Automatic Magneto-Optic Rotation Tester."

JEWELL H. PEDERSEN, *Primary Examiner.*

F. SHOON, A. A. KASHINSKI, *Assistant Examiners.*